Feb. 9, 1926.

J. HERMAN

DETECTOR CIRCUIT

Filed Oct. 13, 1923

1,572,010

INVENTOR
J. Herman

ATTORNEY

Patented Feb. 9, 1926.

1,572,010

UNITED STATES PATENT OFFICE.

JOSEPH HERMAN, OF NEW YORK, N. Y., ASSIGNOR TO AMERICAN TELEPHONE AND TELEGRAPH COMPANY, A CORPORATION OF NEW YORK.

DETECTOR CIRCUIT.

Application filed October 13, 1923. Serial No. 668,384.

*To all whom it may concern:*

Be it known that I, JOSEPH HERMAN, a citizen of the Republic of Austria, residing at New York, in the county of New York and State of New York, have invented certain Improvements in Detector Circuits, of which the following is a specification.

This invention relates to detector circuits and more particularly to improvements in receiving relay circuits to be used in connection with detectors.

Heretofore in multiplex carrier systems in which the carrier channels were employed for the transmission of telegraph signals it has been found necessary to use two or more tubes in the detector circuit in order to obtain sufficient detected current to operate the telegraph receiving relay. It is one of the objects of the present invention to provide a detector circuit in which a single vaccum tube detector may be employed and in which the action of the polar receiving relay will be more efficient.

Figure 1:
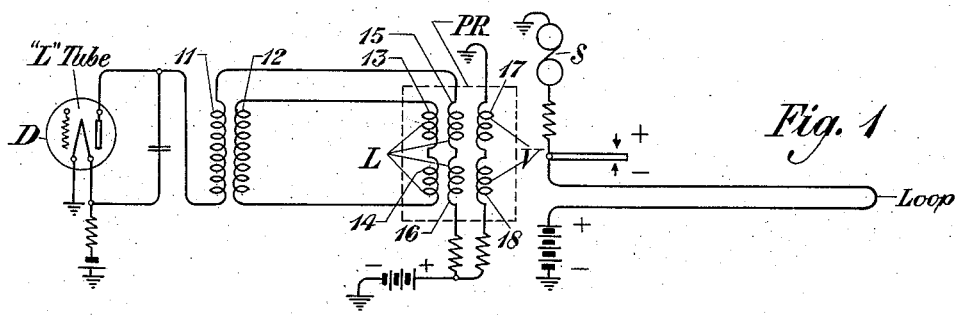
Figure 2:
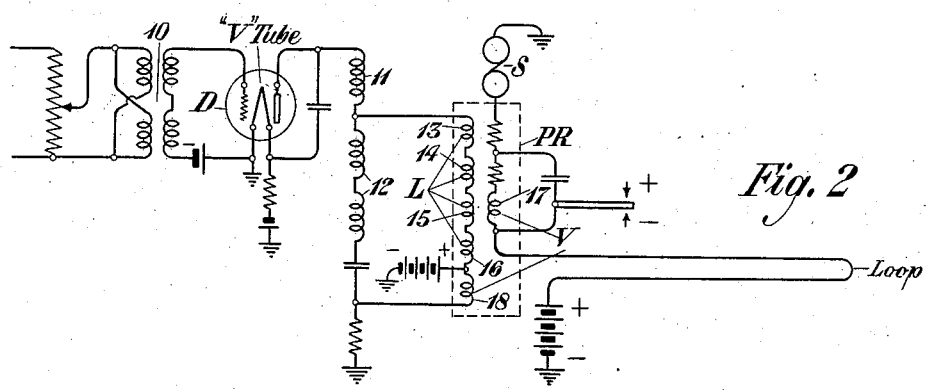
Figure 3:
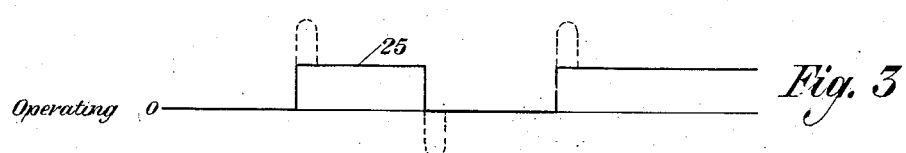

Other and further objects of the invention will be clear from the following description when read in connection with the accompanying drawing, Figure 1 of which illustrates the circuit arrangement of detector circuits of the type hereinbefore employed in connection with carrier telegraph systems, Fig. 2 of which is a circuit diagram illustrating the improved form of detector circuit and Figs. 3 to 7 of which are curves illustrating the operation of the detector circuit of Fig. 2.

In order that the present invention may be clearly understood it is desirable that the type of detector circuit which is now in common use in carrier systems be explained and in this connection reference is made to Fig. 1. In this figure, D represents the final tube of the tandem detector circuit now in common use. In circuits of this type the so-called L tubes have been employed for detecting purposes for the reason that these tubes have a large current output and are therefore capable of furnishing sufficient operating current for the type of polar relay in common use for telegraph receiving purposes. The so-called L tubes are not, however, as sensitive as might be desired and for this reason it is necessary to use two tubes in tandem. The polar receiving relay PR comprises six winding units, numbered 13 to 18 inclusive, which units are so arranged as to form three main windings. The six winding units in relays of this type are usually of two kinds, four of the units being of the type known as "line" windings and two of the units being of the type known as "vibratory" windings. So far as the present invention is concerned the terms "line" and "vibratory" have no significance and these terms will only be used for the purpose of identifying the units. Each line winding unit in practice comprises about 2,000 turns having a resistance of about 200 ohms. The vibratory winding units, which are composed of the outer layers of the coils of the relay, only have about 800 turns each and a resistance of about 115 ohms.

The three main windings of the relay, which are formed from the six units above referred to, perform three separate and distinct functions in the operation of the receiving relay of Fig. 1. One of these windings, comprising the line units 15 and 16, is included directly in the output circuit of the detector tube D and functions as the operating winding of the relay. The other two line units 13 and 14 form the so-called "kick" winding which is connected into a local circuit associated with the output circuit of the detector D through a transformer comprising windings 11 and 12. The two so-called "vibratory" windings 17 and 18 are connected in a local circuit with a source of direct current and constitute the biasing windings of the system.

The detector circuit is so arranged that when high frequency oscillations are not being received the grid potential will be of such value as to prevent the flow of any direct current in the output circuit through the windings 15 and 16. When high frequency oscillations are received, however, a direct current pulse will flow through the operating winding comprising the units 15 and 16 to shift the armature of the polar relay to its opposite position. The value of the current flowing through the vibratory windings is such as to produce a biasing force in a direction opposite to the detected operating force, the magnitude of the biasing force being substantially one-half that of the operating force. The detected pulse of current, therefore, produces a resultant force tending to shift the armature to its alternative position, said force being substantially equal but opposite in sign to the normal biasing force. The purpose of the so-called "kick" winding is to produce a kick at the beginning and at the end of the detected pulse of operating current for the purpose of making the action of the armature quicker and more reliable. The kick impulse is produced by the action of the transformers 11 and 12, due to the change in the value of the current flowing in the operating circuit.

Referring now to Fig. 2 which illustrates a circuit arrangement embodying the principles of the present invention, it will be seen that the detector D comprises a single tube of the so-called V type. In order to use a single tube for detecting purposes in commercial carrier telegraph circuits of the type now in common use it is necessary that the detecting tube be very sensitive. The so-called V type of tube is much more sensitive than the L type tubes heretofore employed in tandem, but owing to its increased sensitivity the actual amplitude of the output current is much smaller than that of the less sensitive L tubes. It is, therefore, necessary to re-design the polar relay set so that the relay will operate efficiently with the smaller detected operating currents supplied by the single detecting tube D. Accordingly, it is proposed in Fig. 2 to supplement the detected operating current with a holding current controlled by the armature of the polar relay in its operation. This necessitates the use of at least one of the winding units of the relay as the holding winding and in order to economically use the remaining windings it is proposed to eliminate the special kick winding and utilize the biasing winding and the operating winding as the kick windings of the relay system.

Accordingly, as illustrated in Fig. 2, the four line winding units 13, 14, 15 and 16 are connected in series with each other and with the B battery of the detector tube so that these four windings constitute the main operating winding. One of the so-called "vibratory" windings 17 is used as the holding winding and is connected in circuit with the armature of the relay so that as the armature shifts from one position to the other to connect positive or negative current to the subscriber's loop, positive or negative current will be caused to flow through the holding circuit in such a direction as to tend to hold the armature against the contact to which it has been shifted. This prevents chattering and other unsatisfactory operation of the relay. The other vibratory winding 18 is connected in a local circuit with the B battery supply so that this winding functions as the biasing winding.

In order to obtain the so-called "kick" impulse at the beginning and end of each detected signaling pulse a transformer comprising windings 11 and 12 is provided. The transformer is in the nature of an autotransformer with the windings 11 and 12 acting as the primary winding of the transformer and the winding 12 connected in a local A—C circuit with the operating winding and the biasing winding of the relay. These two relay windings being included in the local A—C circuit function to produce a kick effect upon the relay as a result of the action of the transformer windings 11 and 12 at the beginning and end of the detected impulse.

Figure 4:
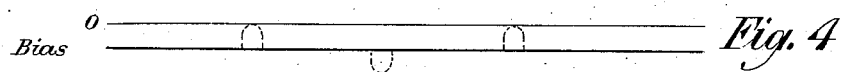
Figure 5:
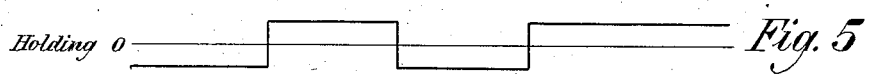

The operation of the windings of the relay will be clear from the curves shown in Figs. 3 to 7 inclusive, which curves show the magnitude and character of the forces acting upon the armature of the relay as a result of the current flowing in the several windings. Let us assume that no high frequency oscillations are received during the spacing interval and that the transmission of high frequency oscillations corresponds to a marking signal. The normal grid potential of the detector tube D of Fig. 2 is so arranged that no current will flow in the output circuit through the transformer winding 11 and the four line windings 13 to 16 inclusive during the spacing interval. When the train of high frequency waves is received, however, a detected impulse of current will flow, as indicated at 25 in Fig. 3. The biasing current through the winding 18 is in such a direction, as illustrated in Fig. 4, as to produce a pull upon the armature opposite in sign to the force resulting from the marking signal 25. The operation of the armature produces a current wave in the holding winding 17 having the characteristics illustrated in Fig. 5. The pull produced upon the armature is in such a direction as to tend to hold it against the contact to which it has been shifted and consequently, during the marking interval, the force is in the same direction as the force produced by the operating current. During the spacing interval, however, an equal force is exerted upon the armature in the direction opposite to that produced by the operating current. The magnitudes of the two holding forces are substantially equal and preferably are of the same order as that of the biasing force in the winding 18. During the spacing interval the effects of the biasing and holding forces are cumulative and the resultant force should be opposite in sign to but of substantially the same magnitude as the operating force during the marking interval. On the other hand, the biasing and holding forces should oppose and substantially neutralize each other during the marking interval.

Figure 6:
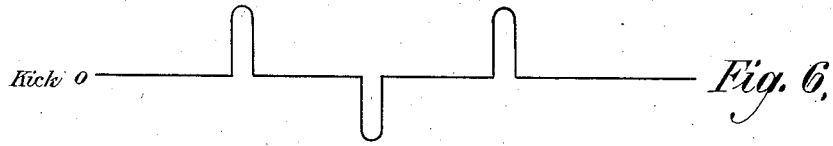
Figure 7:
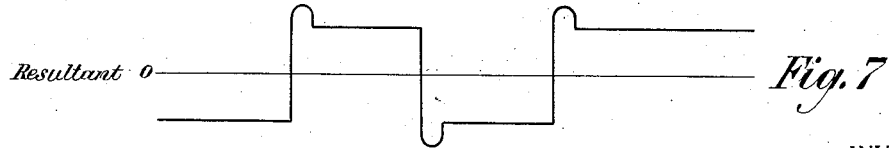

In addition to the forces above discussed the action of the auto-transformer 11—12 produces a kick impulse at the beginning and the end of the marking signal, as illustrated in Fig. 6. The kick impulse occurring at the beginning of the marking period produces an effect in the biasing winding 18 which is opposite in direction to the biasing current, thereby tending to neutralize the biasing force. A biasing impulse is produced at the end of the marking period in such a direction as to be cumulative with respect to the biasing force, as indicated in the dotted lines in Fig. 4. Likewise, forces are produced in the operating winding comprising the units 13 to 16 inclusive at the beginning and the end of the marking interval, as indicated in dotted lines in Fig. 3. The cumulative effect of all of these forces will produce a resultant force having substantially the characteristics indicated in heavy lines in Fig. 7. Analysis of this curve shows that a true polar action is given to the relay, a resultant force in one direction occurring during the marking interval and an equal and opposite force occurring during the spacing interval. At the beginning and end of the interval an effective kick impulse occurs in the same direction as the resultant force operating upon the armature.

By re-arranging the winding units of the standard polar receiving relay in the manner indicated in Fig. 2, the relay operates efficiently in response to the relatively small current supplied by the V type detector tube.

It will be obvious that the general principles herein disclosed may be embodied in many other organizations widely different from those illustrated without departing from the spirit of the invention as defined in the appended claims.

What is claimed is:

1. A detector circuit comprising a highly sensitive detector tube having a small operating current and a polar relay associated with said detector, said polar relay having a large operating winding in the output circuit of the detector and responsive to the detected operating current to shift the armature of the relay, a small biasing winding supplied with a biasing current, and an auxiliary holding winding continuously supplied with current in a direction determined by the position of the relay armature.

2. A detector circuit comprising a highly sensitive detector tube having a small operating current and a polar relay associated with said detector, said polar relay having a large operating winding in the output circuit of the detector and responsive to the detected operating current to shift the armature of the relay, a small biasing winding supplied with a biasing current, and an auxiliary holding winding continuously supplied with current in a direction determined by the position of the relay armature, said biasing and holding windings producing forces which oppose each other when operating current is flowing through the operating winding and which assist each other when no operating current is flowing.

3. A detector circuit comprising a highly sensitive detector tube having a small operating current and a polar relay associated with said detector, said polar relay having a large operating winding in the output circuit of the detector and responsive to the detected operating current to shift the armature of the relay, a small biasing winding supplied with a biasing current, and an auxiliary holding winding supplied with current in a direction determined by the position of the relay armature, said operating winding being included in a local kick circuit inductively associated with the output side of the detector.

4. A detector circuit comprising a highly sensitive detector tube having a small operating current and a polar relay associated with said detector, said polar relay having a large operating winding in the output circuit of the detector and responsive to the detected operating current to shift the armature of the relay, a small biasing winding supplied with a biasing current, and an auxiliary holding winding supplied with current in a direction determined by the position of the relay armature, said biasing winding being included in a local kick circuit inductively associated with the output side of the detector.

5. A detector circuit comprising a highly sensitive detector tube having a small operating current and a polar relay associated with said detector, said polar relay having a large operating winding in the output circuit of the detector and responsive to the detected operating current to shift the armature of the relay, a small biasing winding supplied with a biasing current, and an auxiliary holding winding supplied with current in a direction determined by the position of the relay armature, said operating and biasing windings being included in a local kick circuit inductively associated with the output side of the detector.

6. A detector circuit comprising a highly sensitive detector tube having a small operating current and a polar relay associated with said detector, said polar relay having a large operating winding in the output circuit of the detector and responsive to the detected operating current to shift the armature of the relay, a small biasing winding supplied with a biasing current, and an auxiliary holding winding supplied with current in a direction determined by the position of the relay armature, said operating and biasing windings being included in a local kick circuit inductively associated with the output side of the detector through an auto-transformer connection.

In testimony whereof, I have signed my name to this specification this 11th day of October, 1923.

JOSEPH HERMAN.